US009904951B2

(12) United States Patent
Ortolani

(10) Patent No.: US 9,904,951 B2
(45) Date of Patent: Feb. 27, 2018

(54) REMOTE REFILL PRODUCT ORDERING SYSTEM AND SHOPPING CART PROCESSES

(71) Applicant: Michael Louis Ortolani, Huntington Beach, CA (US)

(72) Inventor: Michael Louis Ortolani, Huntington Beach, CA (US)

( * ) Notice: Subject to any disclaimer, the term of this patent is extended or adjusted under 35 U.S.C. 154(b) by 533 days.

(21) Appl. No.: 14/536,998

(22) Filed: Nov. 10, 2014

(65) Prior Publication Data

US 2015/0134477 A1  May 14, 2015

Related U.S. Application Data

(60) Provisional application No. 61/901,707, filed on Nov. 8, 2013.

(51) Int. Cl.
*G06Q 30/00* (2012.01)
*G06Q 30/06* (2012.01)

(52) U.S. Cl.
CPC .............................. *G06Q 30/0633* (2013.01)

(58) Field of Classification Search
None
See application file for complete search history.

(56) References Cited

U.S. PATENT DOCUMENTS

| | | | | |
|---|---|---|---|---|
| 8,538,829 | B1 * | 9/2013 | Hu ...................... | G06Q 10/087 705/26.1 |
| 9,412,086 | B2 * | 8/2016 | Morse ..................... | F25D 29/00 |
| 2002/0019778 | A1 * | 2/2002 | Isaacson .............. | G06Q 10/087 705/26.1 |
| 2002/0128932 | A1 | 9/2002 | Yung et al. | |
| 2003/0126023 | A1 | 7/2003 | Crampton et al. | |
| 2004/0117358 | A1 * | 6/2004 | von Kaenel ...... | G06F 17/30241 |
| 2005/0177463 | A1 | 8/2005 | Crutchfield et al. | |
| 2007/0293971 | A1 | 12/2007 | Ogle et al. | |
| 2008/0027838 | A1 | 1/2008 | Sawasaki | |
| 2008/0065514 | A1 * | 3/2008 | Eaton ................... | G06Q 10/087 705/26.3 |
| 2008/0183599 | A1 | 7/2008 | Hill et al. | |
| 2011/0016025 | A1 * | 1/2011 | Gaisford .............. | G06Q 10/087 705/27.1 |
| 2012/0004769 | A1 | 1/2012 | Hallenback et al. | |

OTHER PUBLICATIONS

Use Case Based Innovative Design of E-Commerce Website (Rongrong Gong, Shijian Luo, Ji He; IEEE 2009) (Year: 2009).*
Cf Form 1507; application No. 14 859 597.5.

* cited by examiner

*Primary Examiner* — Courtney L Stopp
(74) *Attorney, Agent, or Firm* — Mark H. Plager

(57) ABSTRACT

A shopping cart system and processes are disclosed which allow replenishment of small parts inventory without part numbers, scanners, bar codes, salesman, writing, written purchase orders, and put away without knowing what your are ordering or putting away as a "remote refill" process for mobile computing devices. In some embodiments, the shopping cart program is implemented as a web page shopping cart. In some embodiments, the shopping cart program is implemented as a coded messaging program comprising one of fax, SMS text messaging, and voice calls.

10 Claims, 11 Drawing Sheets

REMOTE REFILL PRODUCT ORDERING SYSTEM AND SHOPPING CART PROCESSES

CLAIM OF BENEFIT TO PRIOR APPLICATION

This application claims benefit to U.S. Provisional Patent Application 61/901,707, entitled "REMOTE REFILL SHOPPING CART SYSTEM," filed Nov. 8, 2013. The U.S. Provisional Patent Application 61/901,707 is incorporated herein by reference.

BACKGROUND

Embodiments of the invention described in this specification relate generally to electronic shopping cart programs, and more particularly, to electronic shopping cart programs that provide remote refill by mobile device.

People make purchase transactions online and very often need to make refill purchases of select items. Time and time again, these people must proceed through the cumbersome process of reordering the items that are routinely refilled. In particular, there are thousands of small parts used in MRO maintenance for repairs of equipment. No process or system to date manages the thousands of small parts used in MRO maintenance for repairs of equipment, and thus, refilling such parts is normally a difficult and costly task. Furthermore, other shopping cart programs leave you directionless in cyberspace, and therefore, make it very difficult to find what you want. Some programs have a good locator or search program, but after buying, the process is gone.

Therefore, what is needed is a way to use a mobile computing device to show a variety of layout templates where products are stored, and which enables simple touch ordering of the parts and inputting into your shopping cart, and where its appearance is only an empty hole and where your delivery comes in it tells you where it goes with pictures.

BRIEF DESCRIPTION

Some embodiments of the invention provide intuitive, visual replenishment of products by way of remote refill ordering patterns that match layout patterns of physical product storage trays and containers. The matching patterns of the product replenishment layout and the physical product storage layout allow replenishment of products, such as small parts inventory, without part numbers, scanners, bar codes, assistance from sales personnel, writing, written purchase orders, or concrete knowledge of the products being ordered because the visually intuitive matching of the patterns obviates the need to know what is being ordered.

Some embodiments include a remote refill shopping cart system that pairs a product order computing device with a set of remote refill server computing devices comprising an order fulfillment computing device over a data network. The product order computing device includes a remote refill shopping cart program that displays a set of remote refill product ordering patterns and a set of products within the patterns. In some embodiments, the set of remote refill server computing devices further comprises a web server computing device. In some embodiments, the set of remote refill server computing devices further comprises a database management server computing device. The order fulfillment computing device includes a processor and an order fulfillment program that runs on the processor of the order fulfillment computing device to receive a product replenishment order from a product order computing device, store information associated with the received order in a remote refill orders database, and complete a transaction in relation to the product replenishment order.

In some embodiments, the product order computing device is a mobile computing device and the remote refill shopping cart program is a mobile software application that runs on a processor of the mobile computing device and displays a graphical user interface (GUI) with the patterns and the products on a display screen of the mobile computing device. In some embodiments, the remote refill shopping cart program is a shopping cart web page in a web browser that runs on a processor of the product order computing device and displays a shopping cart web page GUI with the patterns and the products on a display screen of the product order computing device. In some embodiments, the shopping cart program is implemented as a coded messaging program comprising one of fax, SMS text messaging, and voice calls.

In some embodiments, the order fulfillment computing device includes a web server computing device and the order fulfillment program is implemented as a web service comprising a set of software programs that provide authentication, transaction, and data storage functionality used to receive and fulfill product orders. In some embodiments, the order fulfillment program is implemented as a coded messaging program comprising one of fax, SMS text messaging, and voice calls.

A set of processes are performed in some embodiments for ordering products by way of visually intuitive product selections and for fulfilling product orders. In some embodiments, the set of processes include (i) a remote refill shopping cart process for displaying a set of products that are available to order for product replenishment, (ii) an order fulfillment process for associating a remote refill shopping cart session with a unique shopping cart identifier, receiving a product order in connection with the unique shopping cart identifier during the remote refill shopping cart session, and fulfilling the product order, and (iii) a return customer order fulfillment process for identifying a return customer, associating the return customer with a shopping cart identifier, receiving a product order from the return customer, retrieving a set of fulfillment information related to the return customer, and fulfilling the product order based on the set of fulfillment information related to the return customer.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
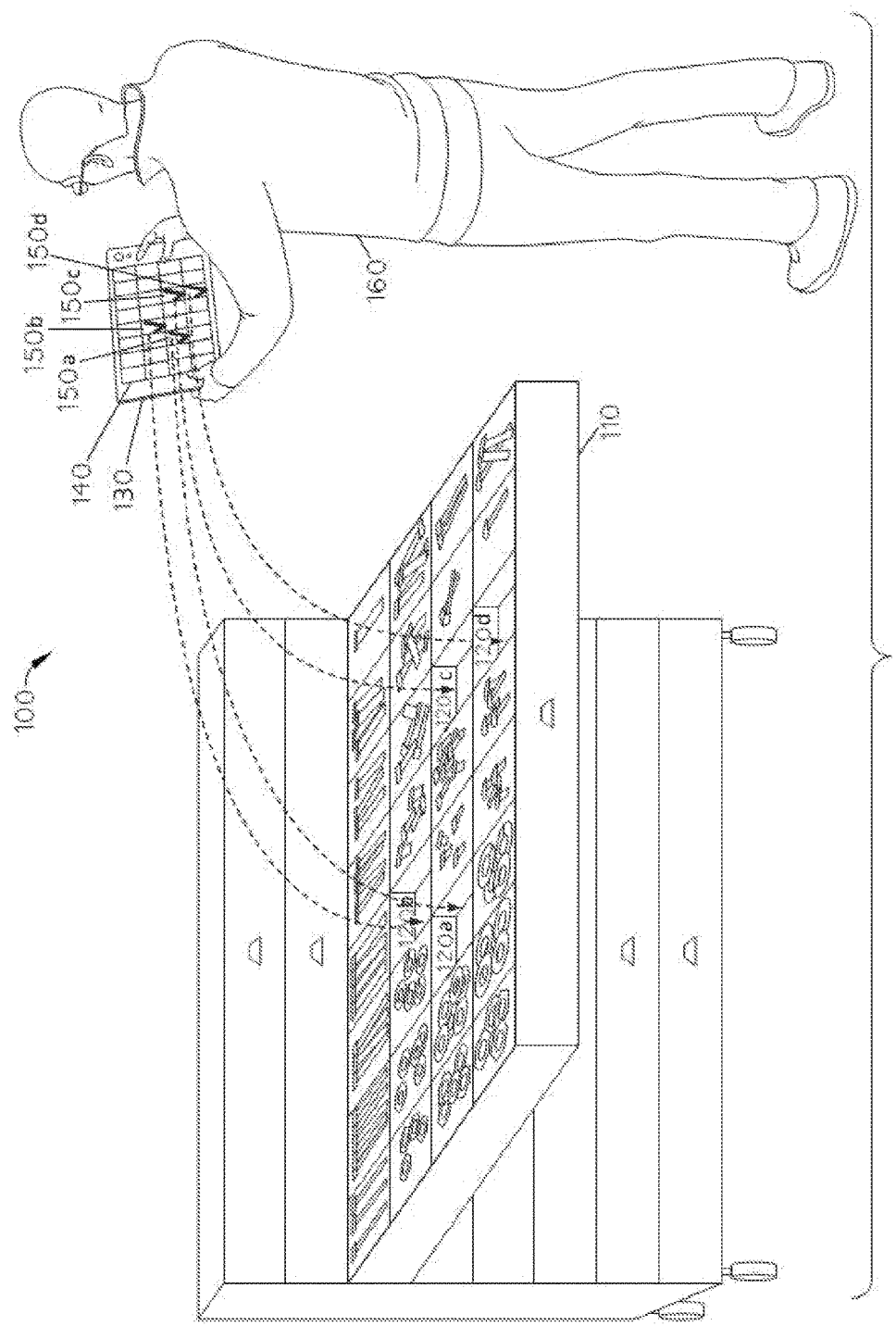

Having thus described the invention in general terms, reference is now made to the accompanying drawings, which are not necessarily drawn to scale, and which show different views of different example embodiments, wherein:

FIG. 1 conceptually illustrates a remote refill shopping cart system in some embodiments while a user is replenishing parts related to a set of empty tray slots in a physical parts tray by selecting a set of corresponding grid slots in a parts grid layout displayed on a mobile computing device.

Figure 2:
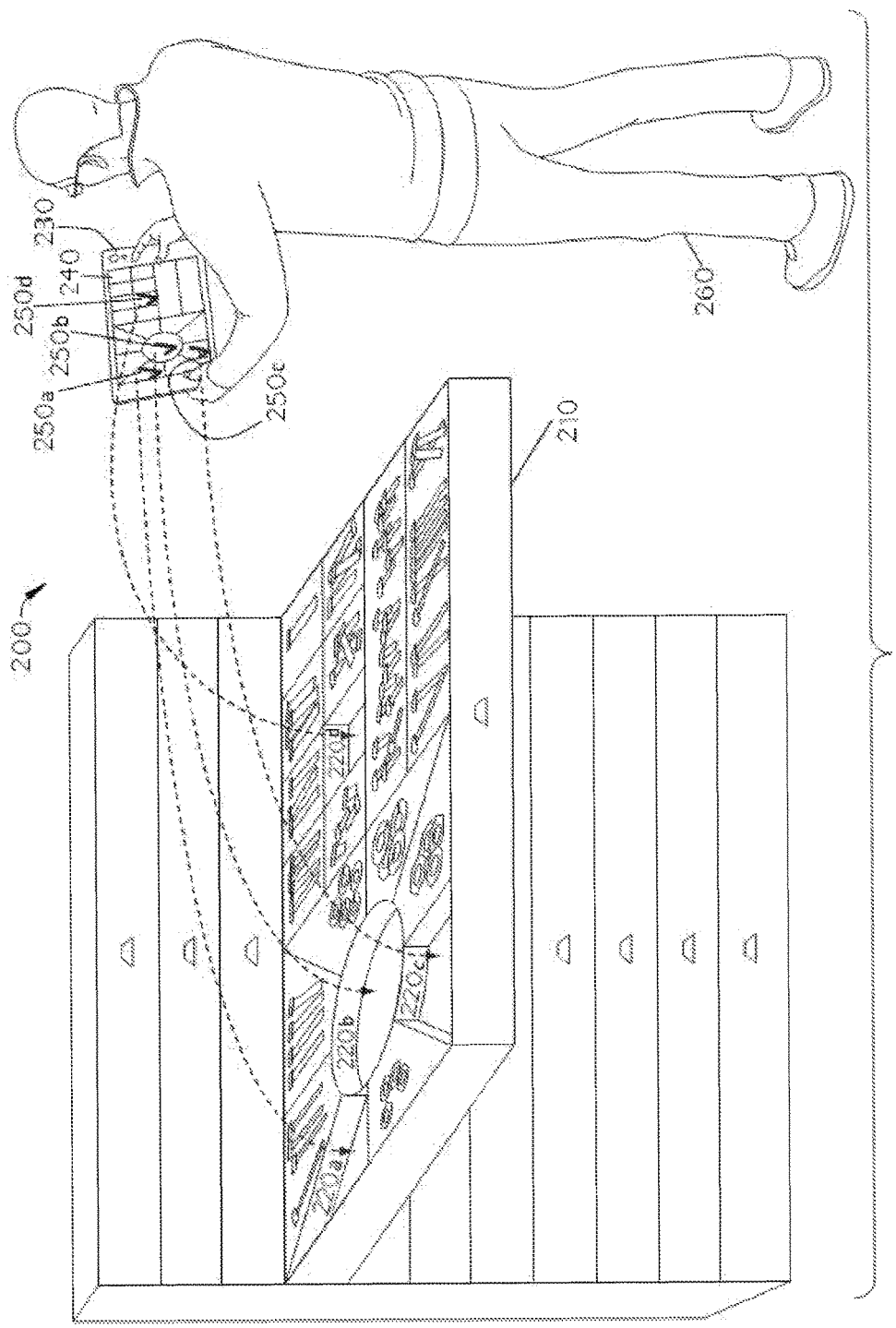

FIG. 2 conceptually illustrates a remote refill shopping cart system in some embodiments while a user is replenishing parts related to a set of empty tray slots in a customized physical parts tray by selecting a set of corresponding grid slots in a customized parts grid layout displayed on a mobile computing device.

Figure 3:
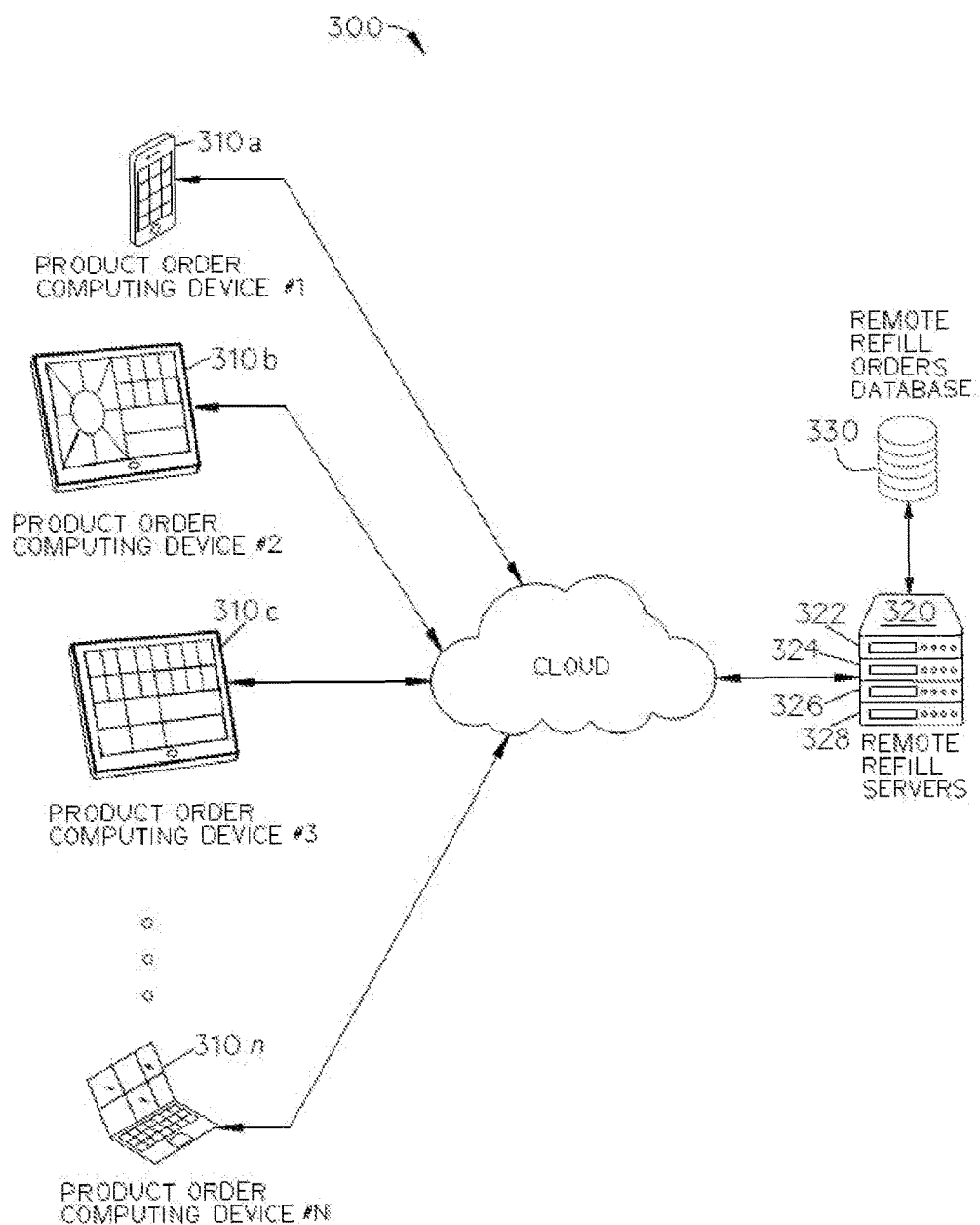

FIG. 3 conceptually illustrates a schematic view of an architecture of a remote refill product ordering system that provides intuitive, visual replenishment of products in some embodiments.

Figure 4:
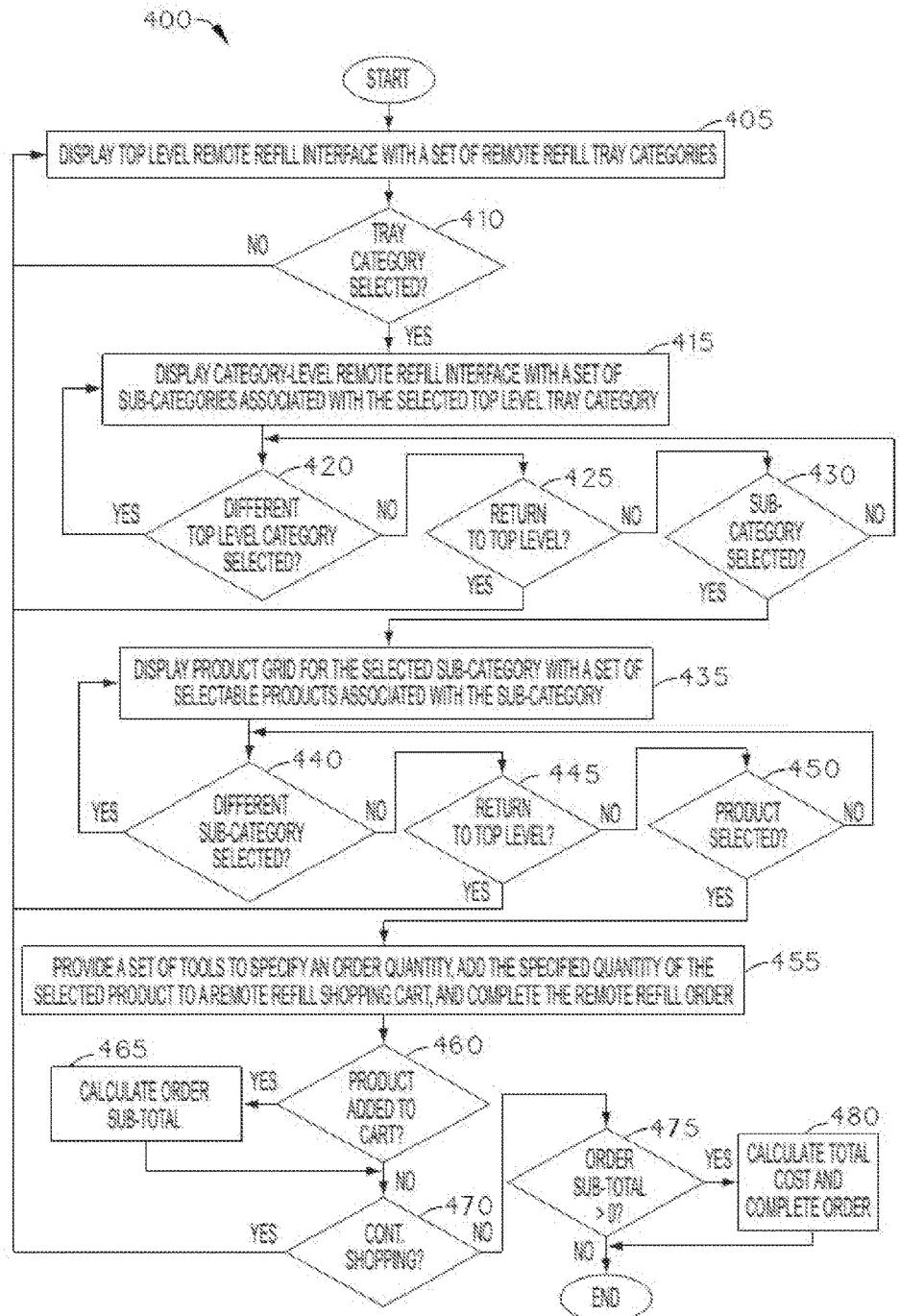

FIG. 4 conceptually illustrates a process for providing a remote refill shopping cart interface that includes a set of product grid layouts that match a set of tray configurations associated with a product replenishment account holder in some embodiments.

Figure 5:
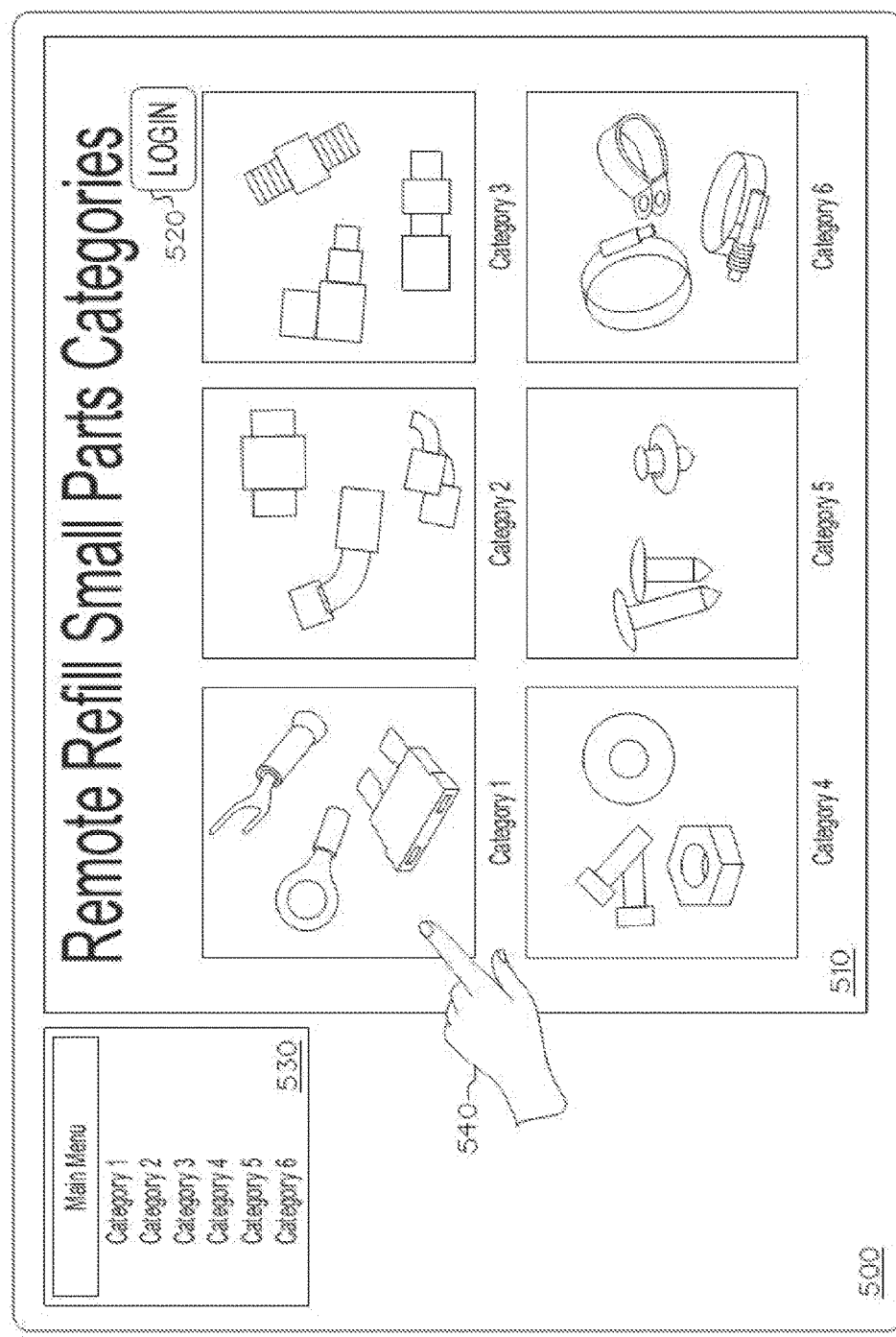

FIG. 5 conceptually illustrates an example of a remote refill shopping cart interface that includes a product category grid layout.

Figure 6:
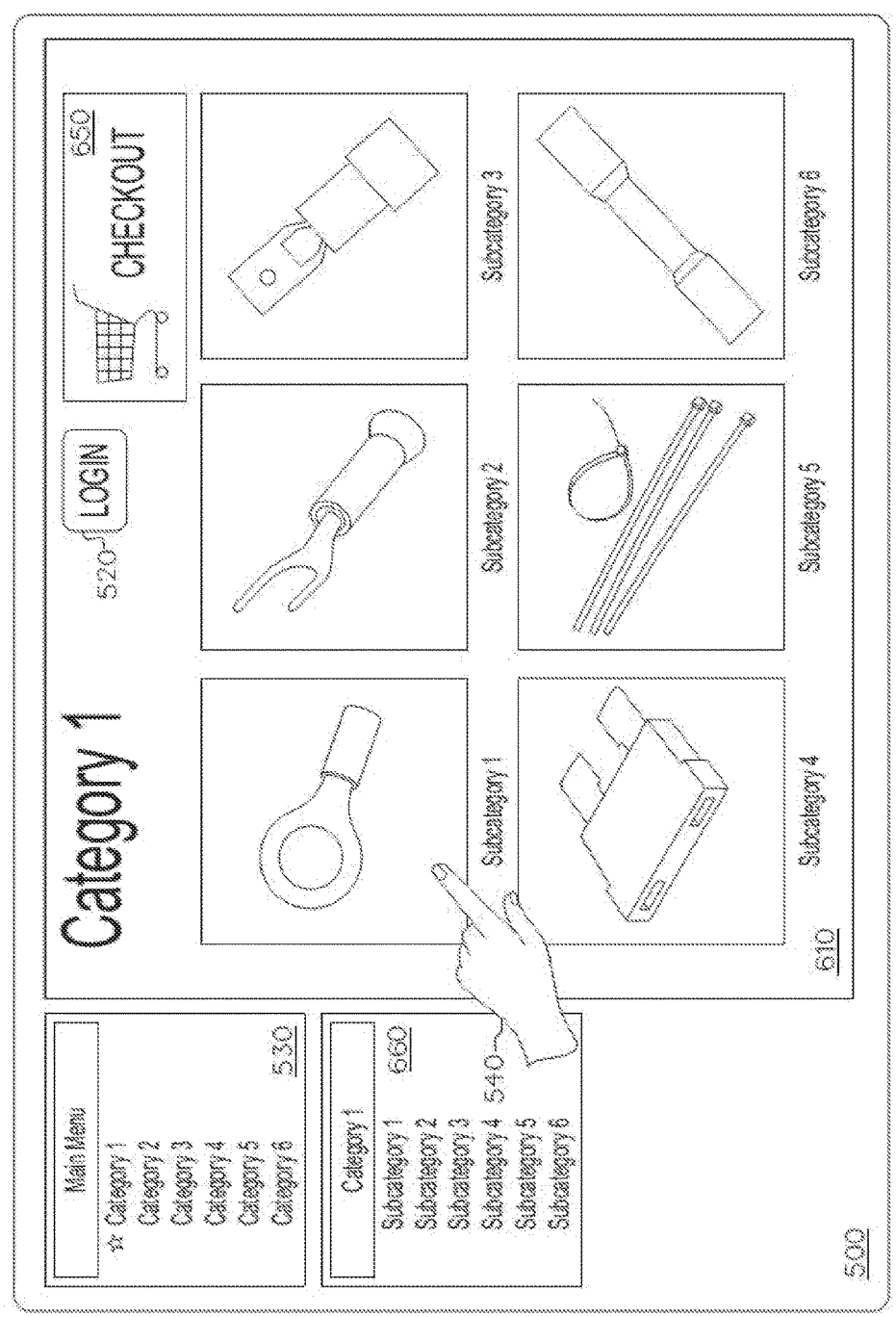

FIG. 6 conceptually illustrates the remote refill shopping cart interface after selection of a top-level category.

Figure 7:
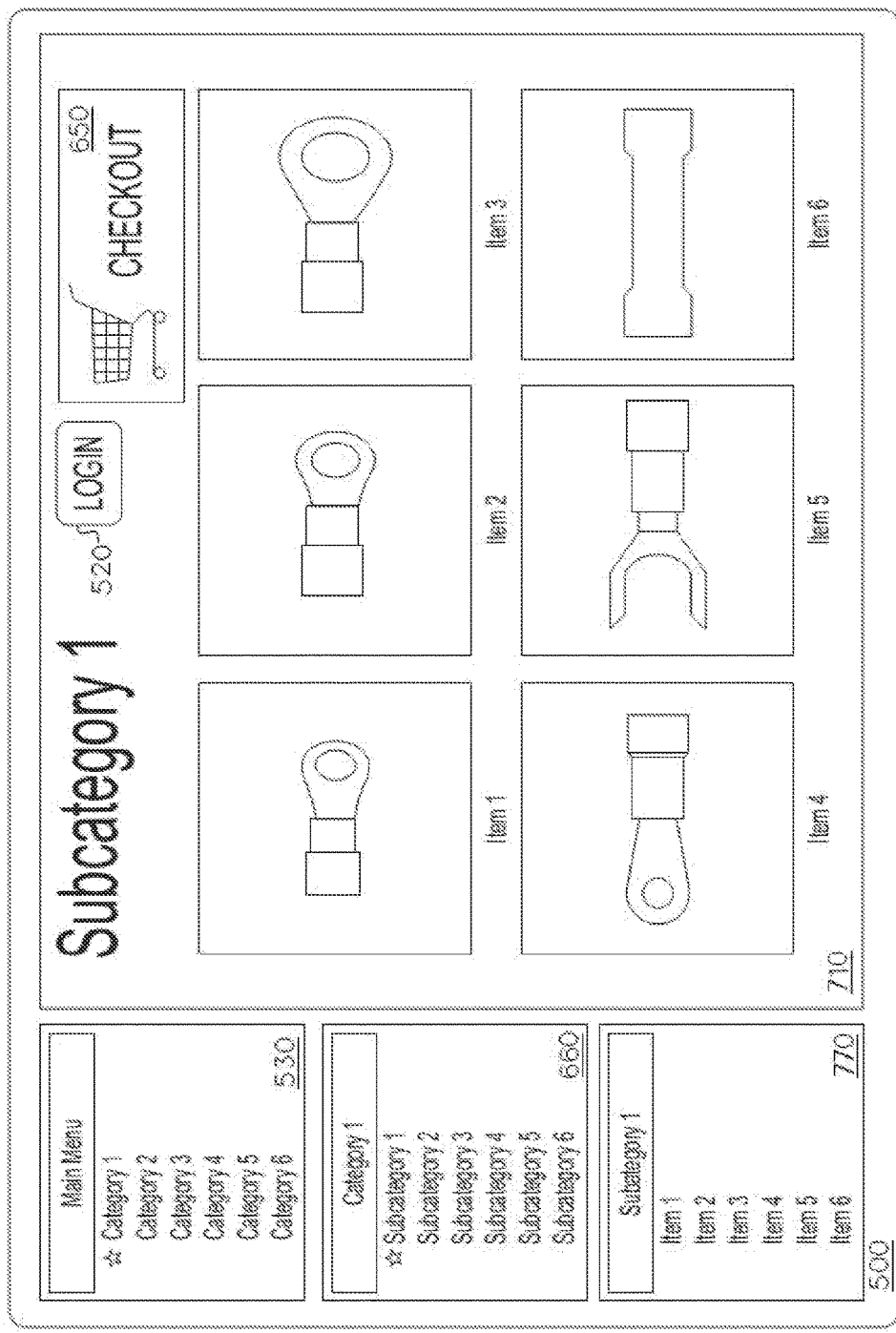

FIG. 7 conceptually illustrates a set of selectable parts in the remote refill shopping cart interface after selection of a sub-category.

Figure 8:
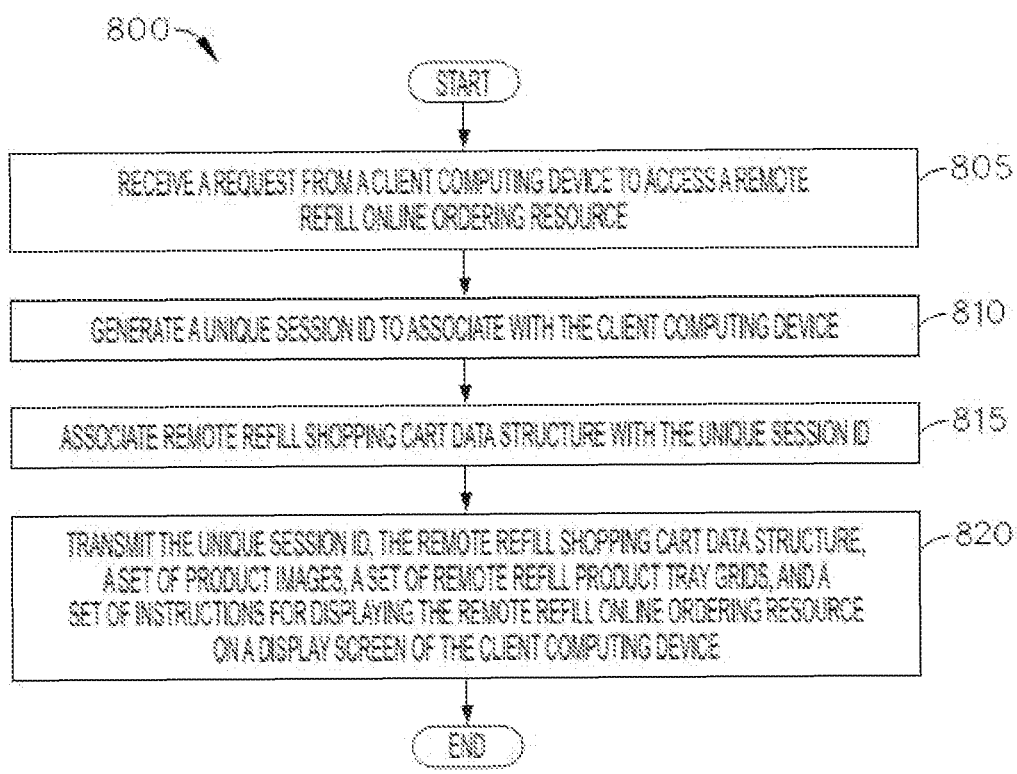

FIG. 8 conceptually illustrates a process for providing a set of remote refill shopping cart resources to display a remote refill shopping cart interface from which a potential buyer can order products in some embodiments.

Figure 9:
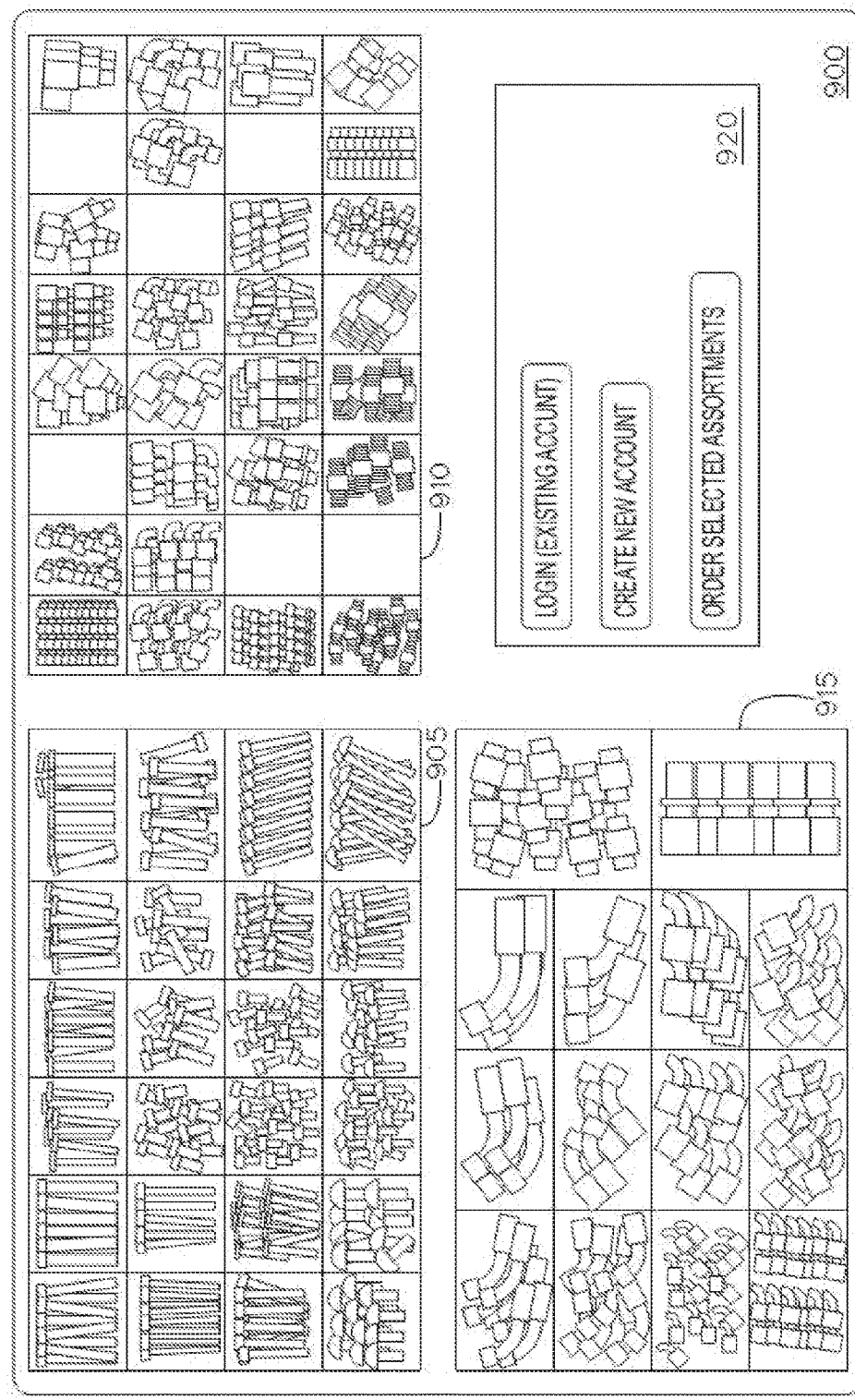

FIG. 9 conceptually illustrates an example of a remote refill shopping cart interface that includes a set of prepackaged starter product assortments in some embodiments.

Figure 10:
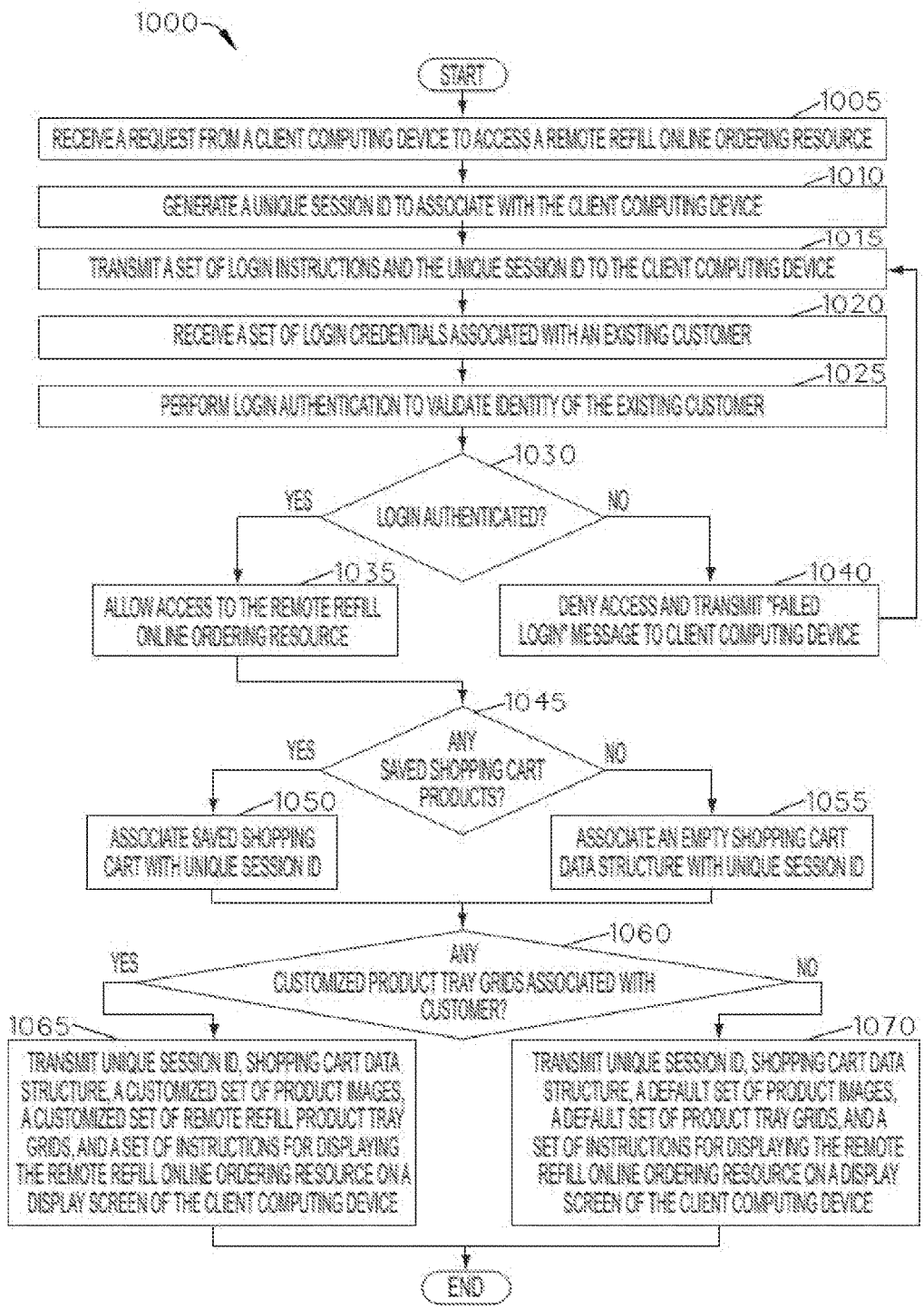

FIG. 10 conceptually illustrates a process for providing a set of remote refill shopping cart resources to an existing product replenishment account holder in some embodiments.

Figure 11:
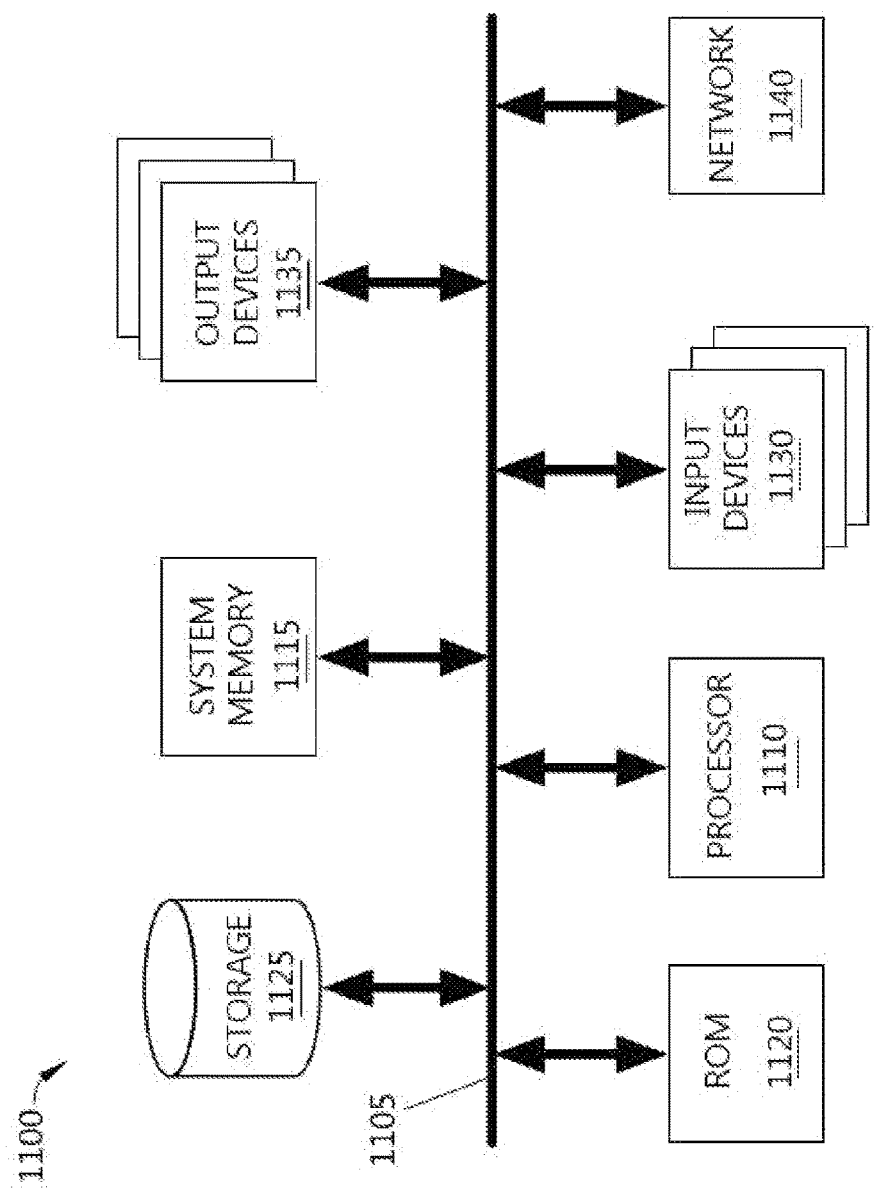

FIG. 11 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

As stated above, people make purchase transactions online and very often need to make refill purchases of select items. Time and time again, these people must proceed through the cumbersome process of reordering the items that they need to have routinely refilled. In particular, there are thousands of small parts used in maintenance, repair, and overhaul/operations in the maintenance and repair of mechanical, plumbing, and electrical devices and equipment (hereinafter referred to as "MRO", "MRO maintenance", or "MRO repair"). No process or system to date manages the thousands of small parts used in MRO maintenance for repairs of any such devices or equipment, and thus, refilling inventories of MRO maintenance parts is typically time-consuming, prone to error, difficult, and costly. Furthermore, other web-based shopping cart programs, processes, and/or systems leave consumers/customers directionless with respect to replenishing the (oftentimes) many categories and types of small parts that are in short supply or entirely sold out at a particular store or inventory location.

Embodiments of the invention described in this specification solve such problems by providing intuitive, visual replenishment of products by way of remote refill ordering patterns that match layout patterns of physical product storage trays and containers. The matching patterns of the product replenishment layout and the physical product storage layout allow replenishment of products, such as small parts inventory, without part numbers, scanners, bar codes, assistance from sales personnel, writing, written purchase orders, or concrete knowledge of the products being ordered because the visually intuitive matching of the patterns obviates the need to know what is being ordered.

I. Remote Refill Product Ordering System

Some embodiments include a remote refill shopping cart system that pairs a product order computing device with a set of remote refill server computing devices comprising an order fulfillment computing device over a data network. The product order computing device of some embodiments includes a remote refill shopping cart program that displays a set of remote refill product ordering patterns and a set of products within the patterns. In some embodiments, the set of remote refill server computing devices further comprises a web server computing device. In some embodiments, the set of remote refill server computing devices further comprises a database management server computing device. In some embodiments, the order fulfillment computing device includes a processor and an order fulfillment program that runs on the processor of the order fulfillment computing device to receive a product replenishment order from a product order computing device, store information associated with the received order in a remote refill orders database, and complete a transaction in relation to the product replenishment order.

A. Matching Layouts of Physical Parts Tray and Displayed Parts Grid

In some embodiments, the product order computing device is a mobile computing device and the remote refill shopping cart program is a mobile software application that runs on a processor of the mobile computing device and displays a graphical user interface (GUI) with the patterns and the products on a display screen of the mobile computing device. In some embodiments, the remote refill shopping cart program is a shopping cart web page in a web browser that runs on a processor of the product order computing device and displays a shopping cart web page GUI with the patterns and the products on a display screen of the product order computing device. In some embodiments, the remote refill shopping cart program is implemented as a coded messaging program comprising one of fax, SMS text messaging, and voice calls.

By way of example, FIG. 1 conceptually illustrates a remote refill shopping cart system 100 while a user 160 is replenishing parts related to a set of empty tray slots 120a-120d of a physical parts tray 110 by selecting a set of corresponding grid slots 150a-150d in a parts grid layout 140 displayed on a mobile computing device 130. As shown in this figure, the physical parts tray 110 and the parts grid layout 140 have matching grid patterns. This simplifies parts ordering because the user 160 only needs to identify the locations of the empty tray slots 120a-120d in the physical parts tray 110 and then select the corresponding grid slots 150a-150d from the parts grid layout 140 displayed on the mobile computing device 130.

B. Custom Layouts of Physical Parts Trays and Displayed Parts Grids

While the parts grid layout 140 displayed on the mobile computing device 130 is configured to match the layout of the physical parts tray 110 in FIG. 1, in some embodiments, customized parts grid layouts are used in connection with different layouts of physical parts trays. By way of example, FIG. 2 conceptually illustrates a remote refill shopping cart system 200 while a user 260 is replenishing parts related to a set of empty tray slots 220a-220d in a customized physical parts tray 210 by selecting a set of corresponding grid slots 250a-250d in a customized parts grid layout 240 displayed on a mobile computing device 230. As shown in this figure, the physical parts tray 210 and the customized parts grid layout 240 have matching customized grid patterns. This simplifies parts ordering because the user 260 only needs to identify the locations of the empty tray slots 220a-220d in the physical parts tray 210 and then select the corresponding customized grid slots 250a-250d from the customized parts grid layout 240 displayed on the mobile computing device 230.

C. Network Architecture of Remote Refill Product Ordering System

Some embodiments include a remote refill shopping cart system that pairs a product order computing device with a set of remote refill server computing devices comprising an order fulfillment computing device over a data network. The product order computing device of some embodiments includes a remote refill shopping cart program that displays a set of remote refill product ordering patterns and a set of products within the patterns. In some embodiments, the set of remote refill server computing devices further comprises a web server computing device. In some embodiments, the set of remote refill server computing devices further comprises a database management server computing device. In some embodiments, the order fulfillment computing device includes a processor and an order fulfillment program that runs on the processor of the order fulfillment computing device to receive a product replenishment order from a product order computing device, store information associated with the received order in a remote refill orders database, and complete a transaction in relation to the product replenishment order.

The remote refill shopping cart system of the present disclosure may be comprised of the following elements. This list of possible constituent elements is intended to be exemplary only and it is not intended that this list be used to limit the system of the present application to just these elements. Persons having ordinary skill in the art relevant to the present disclosure may understand there to be equivalent elements that may be substituted within the present disclosure without changing the essential function or operation of the system.

1. main menu of shopping cart
2. templates for shopping cart

The various elements of the system of the present disclosure may be related in the following exemplary fashion. It is not intended to limit the scope or nature of the relationships between the various elements and the following examples are presented as illustrative examples only. Main menu is provided as an external user interface of the shopping cart. In some embodiments, the program is not driven by touch screen software, but instead is operated with hard copy faxed version which can make what is a very difficult and time consuming task into an easy and effortless operation.

By way of example, FIG. 3 conceptually illustrates a schematic view of an architecture of a remote refill product ordering system 300 that provides intuitive, visual replenishment of products in some embodiments. As shown in this figure, the remote refill product ordering system 300 includes a plurality of product order computing devices 310a-310n, a set of remote refill servers 320, and remote refill orders database 330. The set of remote refill servers 320 includes at least an order fulfillment server computing device 328. The set of remote refill servers 320 may also include separate computing device servers, such as (i) a web server 326, which provides a hosted connection network address (e.g., an IP address, a web URL, etc.) and performs a set of authentication operations in relation to return customers trying to access the order fulfillment server to replenish parts, (ii) a database management server 322 that interfaces with the remote refill orders database 330 to store and retrieve information related to remote refill orders, images of products available to order, and different transactional information related to connection sessions for any authenticated or allowed product order computing device using the remote refill product ordering system 300, and/or (iii) a remote refill registration and activation server computing device 324 that registers each new user of the remote refill product ordering system 300 (e.g., when a user is unregistered and chooses to register) and a computing device associated with the user, and provides a remote refill shopping cart program for installation and activation on the computing device of the user.

Each of the product order computing devices 310a, 310b, 310c, and 310n connects to the servers 320 over a network (labeled "cloud" in the system 300 in this figure), such as the Internet, to send and receive data (e.g., order types, parts types, quantity, etc.). In some embodiments, information for each order received at the order fulfillment server computing device 328 is temporarily stored in one or more databases (not shown) and/or file server folders on the order fulfillment server computing device 328. In some other embodiments, the order fulfillment server computing device 328 does not store any order information, but instead processes the received order on-the-fly to generate a shipping request with the ordered parts. For example, if a product order computing device connects to the remote refill ordering system 320 and the user does not log into the system 320, then the remote refill ordering system 300 will treat the order as coming from a one-time customer. When the remote refill ordering system 300 works in real-time to process an order, the servers 320 may pass on information (e.g., shipping address, name of receiving party, contact information, etc.) to a parts inventory department or shipping department so that the order can be accurately completed.

Additionally, the servers 320 can scale to accommodate multiple simultaneous product order computing device connections and orders. In some embodiments, one or more of the server computing devices 320 includes multiple processors or software that is multi-threaded, in order to scale to any number of simultaneous connections and/or orders. In some embodiments, the order fulfillment server computing device 328 provides a login interface so that a user of a product order computing device can access the remote refill ordering system 300 through an existing registered account. In addition, in some embodiments, the order fulfillment server computing device 328 performs authentication operations in relation to login attempts received from product order computing devices. In some embodiments, one or both of the login interface and the authentication operations are provided by or performed by the web server computing device 326.

The remote refill product ordering system 300 of the present disclosure generally works by a remote refill shopping cart program that runs on the product order computing devices 310a-310n, and provides a visually intuitive location association between displayed ordering trays and physical parts inventory trays. In some embodiments, the remote refill shopping cart program is a mobile app that runs on a mobile computing device, such as a smartphone or tablet computing device. In some embodiments, the remote refill shopping cart program is provided through a web browser that runs on any supported computing device. In some embodiments, the remote refill shopping cart program is an installed program on a computing device, such as a desktop computer or laptop computer.

The remote refill product ordering system 300 differs from and improves upon currently existing options for ordering parts that routinely need to be replenished. In particular, some embodiments of the system 300 differ because a user can visualize the parts that need to be replenished (e.g., sight inspection) and can simple select corresponding boxes in similar layout patterns to buy from the fixed locations in physical trays, containers, or other storage locations. For example, you might have up to five storage locations. Current shopping carts do not do this. In general, current shopping cart programs allow a person to order but do not provide a fixed place to put it away and you have to know what your are buying (e.g., each of the items in your shopping cart). With the remote fill system and process described in this disclosure, a user does not need to know what he is buying to buy it.

The user also does not need to know where is goes to put it away. In addition, these embodiments improve upon the currently existing options by improving a person's ability to make refill replenishing orders. As the current options typically do not make it easy to find what is being looked for, they tend to be time-consuming and cumbersome. For example, a user calls up a part and gets a page with one or thousands of results. Even if the user can find it after several clicks, there is no clearly defined storage location when it shows up on screen. In contrast, the remote refill product ordering system 300 allows a user to buy and put away replenishment of small parts without having to know what the user is buying or where is goes. Also, the remote refill program works ideally with mobile computing devices such as smartphones, tablets, laptops, or other computing devices which show the layout templates (e.g., five templates, ten templates, or whatever number of templates is used in the field), where products are stored by touching the empty location on the display to order the parts for delivery.

Thus, by using the remote refill product ordering system 300 of the present disclosure, a person would be able to manage thousands of parts and keep optimum level of inventory without knowing what specific parts are being replenished or where such parts are stored. The remote refill product ordering system 300 is easy to use and replaces salesman, bar codes, scanners, writing, purchase orders and part numbers.

II. Remote Refill Shopping Cart Process

In some embodiments, a remote refill shopping cart process is performed to order products by way of visually intuitive product selections in fixed locations of product order layouts that match physical parts containers and/or trays. In some embodiments, the remote refill shopping cart process displays a set of products that are available to order for product replenishment in the fixed locations which correspond to tray slots of the physical parts containers and/or trays.

FIG. 4 conceptually illustrates a process 400 for providing a remote refill shopping cart interface that includes a set of product grid layouts that match a set of tray configurations associated with a product replenishment account holder. The process 400 is performed by a remote refill shopping cart program that runs on a processor of a product order computing device, such as any one of the product order computing devices 310a-310n described by reference to FIG. 3. Several of the steps of the process 400 are described by reference to FIGS. 5-7, which conceptually illustrate graphical user interfaces (GUIs) of an example remote refill shopping cart program used to display parts to order for replenishment in layouts configured to match existing physical parts trays.

The process 400 starts when a user of computing device with the remote refill shopping cart program accesses the remote refill shopping cart system. Thus, the process 400 displays (at 405) a top level remote refill interface with a set of remote refill tray categories. Next, the process 400 determines (at 410) whether a tray category is selected. When a tray category is not selected, the process 400 returns to 405 to continue displaying the top level remote refill interface and associated top-level categories of parts. On the other hand, when a tray category is selected, the process 400 transitions to 415 to display a remote refill interface associated with the selected category, which is described further below.

Referring now to FIG. 5, which conceptually illustrates an example of a remote refill shopping cart interface 500 that includes a product category grid layout 510, a login tool 520, and a main menu category selection list 530, the user is able to select any of the available parts categories (Categories 1-6) to identify the type of parts to replenish. As shown by the hand and finger 540 overlaying the remote refill shopping cart interface 500, "Category 1" is being selected. Selections in the remote refill shopping cart interface 500 can be made in any conventional manner known in the field, including any type of pointing device associated with a cursor, such as a mouse, a trackball, etc., as well as a finger for touch-sensitive display screens, as is shown in this example.

Alternatively, the hand/finger 540 selection of "Category 1" or any of the other categories could have been made from the "Main Menu" category selection list 530. Although this example does not indicate whether a user associated with the hand and finger 540 has logged into the system, the remote refill shopping cart interface 500 provides a login tool 520 whereby the user would be able to enter login credentials (e.g., username/password) to access an existing account and then use the interface to make selections. The advantage of logging into the system is evident when the user saved a remote refill shopping cart order from a prior connection to the system, but saved the shopping cart order and all parts in the order without completing the order. In that case, the user would be able to quickly revive the prior remote refill shopping cart order and complete the transaction to replenish the parts selected. Another advantage is that a user likely would have saved a number of details related to replenishing parts, such as the shipping address, contact information, etc.

Now referencing FIG. 6, which conceptually illustrates the remote refill shopping cart interface 500 after selection of a top-level category, some changes to the interface 500 are present. As shown in this figure, the remote refill shopping cart interface 500 now displays a product sub-category grid layout 610 several with sub-categories (i.e., sub-categories 1-6) of parts to replenish and the main menu category selection list 530 now includes an indicator (e.g., a star symbol) adjacent to the selected category (which is the parent category of the presently displayed sub-categories). Also, a checkout tool 650 is displayed near the login tool 520 and a sub-category selection list 660 is displayed in relation to the selected category (i.e., "Category 1" in this example). As shown by the hand and finger 540 overlaying the remote refill shopping cart interface 500, "Subcategory 1" is being selected.

Returning to FIG. 4, when the process 400 determines (at 410) that a category is selected, the process 400 then displays (at 415) a category-specific remote refill interface with a set of sub-categories associated with the selected top-level parts tray category. In some embodiments, the category-specific remote refill interface is a product level interface from which a user can select one or more products to replenish. However, while it is possible to transition directly to a product-level interface after selection of a category, it is equally likely that any selected category includes a set of sub-categories before specific products are displayed in the interface for order selection. Therefore, so as not to obscure the specification with unnecessary details, the example of the process 400 described herein includes a sub-category level selection before a user is able to select one or more specific parts for replenishment.

After the process 400 displays the set of sub-categories in the remote refill interface, the process 400 next determines (at 420) whether a different top-level category has been selected. As noted by reference to FIG. 6, the remote refill shopping cart interface 500 includes a list 530 of selectable categories from which a user may select a different category or return to the main menu. For example, after the user sees the set of sub-categories displayed based on the selection of "Category 1", the user may then determine that a different category should be selected, such as "Category 2". When a different category-level selection is made, the process 400 transitions back to 415 to display the remote refill interface with the set of category-specific sub-categories displayed (e.g., after changing the category from "Category 1" to "Category 2", displaying the set of sub-categories of "Category 2" instead of the set of sub-categories of "Category 1").

On the other hand, when the category remains the same, the process 400 then determines (at 425) whether to return to the main menu (i.e., the top-level). For example, if the user decides to start over, he or she may use the main menu category selection list 530 to select the "Main Menu" at the top of the list, which will then result in the remote refill shopping cart interface 500 displaying the main menu (i.e., top-level interface). Thus, when the main menu is determined to be selected, the process 400 transitions back to 405 to display the top-level interface with the set of top-level categories. However, when the process 400 does not need to return to the top-level interface, the process 400 then determines (at 430) when any sub-category is selected. When no sub-category is presently selected, the process 400 repeats the determinations made at 420, 425, and 430 again. In this way, the process 400 is awaiting an action by the user in the remote refill shopping cart interface 500.

At some point, the user may select a particular sub-category. When the process 400 determines that a sub-category is selected, then the process 400 displays (at 435) a product grid for the particular selected sub-category, along with a set of selectable products associated with the sub-category. As described above in reference to selecting a category and transitioning directly to a product-level interface, a person skilled in the art would recognize that any given category or sub-category can have additional tiers of sub-categories which further break down the types of products or parts associated with the high level category presently selected. Thus, while this example describes a single sub-category selection associated with a particular selected category, and then presents a product-level interface, it is understood that the steps of the process 400 related to the sub-category selection are repeated based on the number of tiers of sub-categories related to the particular selected top-level category.

Referring to FIG. 7, which conceptually illustrates the remote refill shopping cart interface 500 after selection of a particular sub-category. As shown in this figure, the remote refill shopping cart interface 500 now displays a product item grid layout 710 with several items (e.g., products, small parts, etc.) and the category-level selection list 660 now includes an indicator (e.g., a star symbol) adjacent to the selected sub-category (i.e., "Subcategory 1" which is the parent category of the presently displayed set of items). Also shown is a sub-category item selection list 770, allowing a user to quickly navigate to any item associated with the presently selected sub-category (i.e., "Subcategory 1"). Together with the category-level selection list 660 and the main menu category selection list 530, the user would also be able to quickly navigate to any sub-category associated with the presently selected category (i.e., "Category 1") and to any top-level category (i.e., Categories 1-6).

Turning back to FIG. 4, the process 400 performs a set of steps to determine (i) whether a different sub-category is selected, (ii) whether to return to the top-level interface, or (iii) whether a product item is selected from the presently displayed product item grid layout 710. Similar to the follow-up steps after determinations 420, 425, and 430, the process 400 at this juncture returns to 435 to display the product item-level grid layout associated with a different sub-category when a different sub-category is selected. Also, when the user selects the main menu tool, the process 400 returns to 405 to display the top-level remote refill interface 500. However, when a particular item is selected, the process 400 then provides (at 455) a set of tools to input an order quantity, add the specified quantity of the particular item to a remote refill shopping cart, and complete the remote refill order to replenish the parts associated with the particular selected item.

For example, the user might specify a quantity of 50 to replenish a part related to a specific displayed item, and then continue shopping for more parts to replenish, or complete the transaction. The process 400 next determines (at 460) whether the selected item (at some specified quantity) has been added to the shopping cart. When the product is not added to the shopping cart, the process 400 transitions to 470 to determine whether the user wishes to continue shopping, as is further described below. However, when the product is added to the shopping cart, the process 400 updates a set of information related to an order transaction. As noted above, when the remote refill shopping cart program performs the process 400, the shopping cart is a data structure that encapsulates a set of remote refill order information into a single unit to process in a single transaction. In this way, a user can make several parts replenishment selections in relation to several physical parts trays and containers which they may use in a store or for parts inventory, or the user may complete several separate transactions to replenish each of several different parts orders. Thus, when the selected product is added to the shopping cart, the process 400 calculates (at 465) a sub-total for the entire order (including any previously added products or parts).

In some embodiments, the process 400 determines (at 470) whether the user continues to shop by identifying one or more actions made in the remote refill shopping cart interface 500. When the user continues to shop (e.g., selection of the main menu), the process 400 transitions back to 405, which is described in greater detail above. However, when the process 400 determines that the user is not continuing to shop via the remote refill product ordering system, then the process 400 must complete, save, or trash any transactions presently pending. In some embodiments, the remote refill shopping cart interface 500 includes a tool (not shown) which when selected causes a current session, which is associated with the user's product order computing device, to terminate. Also, anything saved in relation to the session prior to ending the session can be retrieved if the user is a registered user associated with a remote refill product ordering system account. In some embodiments, a remote refill product ordering session may also time out after a particular amount of time lapses with no interaction in the remote refill shopping cart interface 500. Thus, when the process 400 determines that the user is not continuing to shop, the process 400 transitions to 475 to check if any sub-total is associated with products in the shopping cart (if any). When no products or parts are associated with a shopping cart for the present session, the process 400 then ends. However, if one or more products or parts are associated with the shopping cart of the present session, the process 400 then calculates (at 480) a total amount for the transaction and completes the order. In some embodiments, the remote refill shopping cart interface 500 includes a set of transaction payment tools (not shown) which allow the user to enter payment information or select a previously saved payment method (e.g., credit card, bank account, etc.) to complete the transaction. Then the process 400 ends.

To implement the remote refill shopping cart process 400 of the present disclosure, a person may need to write the software needed to tie in the fixed locations with templates and offer product for sale base on location not the product itself. The person would need the shopping cart data structure to be developed and may optionally require users to be signed in (e.g., by authenticated login) to use it and pay for the product. You can shop and pay or in some embodiments the backend can offer net 30 terms on orders. Although different industries may use different templates, in general, tray customization would be needed to associate the parts locations in a tray with the remote refill shopping cart interface. For instance, every MRO shop car truck and maintenance shop in the country may use the five locations which are industry standards, not unlike a light bulb the locations, but where the templates are like bins made by a bin making company and sold worldwide. On the other hand, the remote refill product ordering system and the remote refill shopping cart program and interface would operate in the same manner as described above when customized trays and/or containers are used.

III. Remote Refill Order Fulfillment Server Processes

In some embodiments, a set of remote refill order fulfillment server processes are performed to receive parts replenishment orders and complete transactions for the orders. In some embodiments, the set of remote refill order fulfillment server processes include (i) an order fulfillment process for associating a remote refill shopping cart session with a unique shopping cart identifier, receiving a product order in connection with the unique shopping cart identifier during the remote refill shopping cart session, and fulfilling the product order and (ii) a return customer order fulfillment process for identifying a return customer, associating the return customer with a shopping cart identifier, receiving a product order from the return customer, retrieving a set of fulfillment information related to the return customer, and fulfilling the product order based on the set of fulfillment information related to the return customer.

By way of example, FIG. 8 conceptually illustrates a process 800 for providing a set of remote refill shopping cart resources to display a remote refill shopping cart interface from which a potential buyer can order products or parts. The process 800 is performed by a remote refill order fulfillment program that runs on a remote refill order fulfillment server of a remote refill product ordering system, such as the remote refill order fulfillment server 328 of the remote refill product ordering system 300 described by reference to FIG. 3.

The process 800 starts when a client computing device, such as one of the product order computing devices 310*a*-310*n*, connects to the remote refill order fulfillment server. In some embodiments, the client computing device connects to a web server, such as the web server 326 described by reference to FIG. 3, and the web server routes data between the client computing device and the remote refill order fulfillment server.

In some embodiments, the process 800 first receives (at 805) a request from a client computing device to access a remote refill online ordering resource. For example, the client computing device may request access to a set of parts inventory information related to a set of default tray layouts when a remote refill shopping cart program is launched on the client computing device and a connection to the server is made.

Next, the process 800 of some embodiments generates (at 810) a unique session ID to associate with the client computing device. The process 800 then associates (at 815) a remote refill shopping cart data structure with the unique session ID. Thereafter, the process 800 transmits (at 820) the unique session ID, the remote refill shopping cart data structure, a set of product and parts images, a set of remote refill product tray grids, and a set of instructions for displaying the remote refill online ordering resource on a display screen of the client computing device. For example, the set of instructions for displaying the remote refill online ordering resource may include a set of instructions for identifying a display screen size of the client computing device and rending the remote refill online ordering resource with a set of parts and product images in a remote refill shopping cart interface of the remote refill shopping cart program running on the client computing device.

The process 800 is a general server process that would enable any client computing device of a user to connect to the server and order one or more parts assorted in default tray configurations. However, in some embodiments, a user may wish to start fresh (i.e., no parts or trays in their store or parts inventory center) by ordering one or more prepackaged assortments of parts and trays (with predefined grid layouts matching grid layouts in the remote refill shopping cart interface). Also, the user may wish to register as an return customer with an authorized account and validated payment, tray configuration (e.g., customized trays), contact, and/or shipping address information.

By way of example, FIG. 9 conceptually illustrates an example of a remote refill shopping cart interface 900 that includes a set of prepackaged starter parts assortments 905, 910, and 915. A prepackaged starter parts assortment includes a set of parts or items and a tray that is configured to be used in connection with the remote refill product ordering system of some embodiments. For example, the prepackaged starter parts assortment 905 includes a full set of parts in each available tray slot. The tray slots of the prepackaged starter parts assortment 905 come as a default "same dimension" configuration. In contrast, the prepackaged starter parts assortment 910 includes several "empty" tray slots with no parts included. In some embodiments, the "empty" tray slots can be custom configured by a user of the system to associate corresponding tray slots in the grid layout of the remote refill shopping cart interface to any types of parts the user should feel needs to be routinely replenished. Also, the prepackaged starter parts assortment 915 includes several tray slots of a first size, and a couple of other tray slots of a second size. In this case, the grid layout of the remote refill shopping cart interface would be similarly configured for the display screen of the computing device, thereby allowing the user to easily select tray slots in the grid layout of the interface by visual inspection of physical tray slots of corresponding physical parts trays. While the remote refill shopping cart interface 900 shows only three prepackaged starter parts assortments 905, 910, and 915, a person skilled in the art would understand that any type of prepackaged starter parts assortments can be provided. In some cases, prepackaged starter parts assortments might include one or more physical trays with no included parts. Similarly, an existing user with a particular type of physical tray may order one or more prepackaged starter parts assortments without inclusion of the physical trays for the user to receive only the parts for the particular type of physical tray. These and more such example configurations and packages of prepackaged starter parts assortments are possible.

Additionally, the remote refill shopping cart interface 900 includes a set of remote refill user tools 920 that allow a user of the system to login with a set of login credentials (e.g., username and password) associated with an existing remote refill system account, create a new remote refill system account (in the event that none exists for the user), and/or order one or more of the prepackaged starter parts assortments to get started.

Once a person is a registered user of the remote refill product ordering system, the user may wish to replenish parts in relation to existing information saved in the orders database of the remote refill product ordering system. The next example describes a process performed by a program running on a server computing device when a return user accesses the remote refill product ordering system.

FIG. 10 conceptually illustrates a process 1000 for providing a set of remote refill shopping cart resources to an existing product replenishment account holder in some embodiments. The process 1000 starts when a client computing device attempts to access remote refill shopping cart resources provided by the remote refill product ordering system. Thus, the process 1000 receives (at 1005) a request from a client computing device to access a remote refill online ordering resource. The process then generates (at 1010) a unique session ID to associate with the client computing device. To this point, the steps 1005 and 1010 of the process 1000 are similar to the steps 805 and 810 of the process 800. However, the user of the computing device may be a returning customer and wish to login with his or her registered account credentials.

In some embodiments, the process 1000 transmits (at 1015) a set of login instructions and the unique session ID to the client computing device. In some embodiments, the login instructions are instructions for the client computing device to display a set of login tools that the user can interact with to login to the system. Thus, the process 1000 next receives (at 1020) a set of login credentials associated with the existing return customer. For instance, the user may have input a username in a field for username and a password in a field for password, which together are transmitted to the server as a set of login credentials to be validated by the server. Next, the process 1000 performs login authentication (at 1025) to validate the identity of the user against an existing account associated with the input username.

The process 1000 of some embodiments then determines (at 1030) whether the login credentials are valid and the user login attempt to authenticated. When the user is authenticated, the process 1000 transitions to 1035, to allow access to the user, which is described further below. On the other hand, when the login authentication fails, the process 1000 denies access (at 1040) and transmits a "failed login" message to the client computing device, or other similar message indicating failure of the login attempt. The process 1000 then transitions back to 1015, which was described in detail above.

Returning to the determination (at 1030), when the process 1000 successfully authenticates the login credentials, the process 1000 then allows access (at 1035) to the remote refill online ordering resource. At this point, the client computing device is able to navigate through grid configurations associated with a remote refill shopping cart interface and select or order one or more parts or products.

Next, the process 1000 determines (at 1045) whether the authenticated user has any saved shopping carts with parts or products that have been saved, but whose orders were not completed. When there is one or more saved shopping cart with one or more parts or products, the process 1000 associates (at 1050) the saved shopping cart with the unique session ID. On the other hand, when no shopping cart with saved products or parts is present, the process 1000 associates (at 1055) an empty shopping cart data structure with the unique session ID.

Since the process 1000 has associated a shopping cart data structure (either an existing saved shopping cart or a new shopping cart) with the session ID assigned to the client computing device, the process 1000 simply determines (at 1060) whether the customer has any customized product tray grids that need to be transmitted for display on the client computing device. When one or more customized product tray grids are associated with the return customer, the process 1000 transmits (at 1065) the unique session ID, the shopping cart data structure, a customized set of product images, a customized set of remote refill product tray grids, and a set of instructions for displaying the remote refill online ordering resource on a display screen of the client computing device. The process 1000 then ends.

On the other hand, when the return customer is not associated with any customized product tray grids, the process 1000 transmits (at 1070) the unique session ID, the shopping cart data structure, a default (standard) set of product images, a default set of remote refill product tray grids, and a set of instructions for displaying the remote refill online ordering resource on a display screen of the client computing device. The process 1000 then ends.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 11 conceptually illustrates an electronic system 1100 with which some embodiments of the invention are implemented. The electronic system 1100 may be a computer, phone, PDA, or any other sort of electronic device. Such an electronic system includes various types of computer readable media and interfaces for various other types of computer readable media. Electronic system 1100 includes a bus 1105, processing unit(s) 1110, a system memory 1115, a read-only 1120, a permanent storage device 1125, input devices 1130, output devices 1135, and a network 1140.

The bus 1105 collectively represents all system, peripheral, and chipset buses that communicatively connect the numerous internal devices of the electronic system 1100. For instance, the bus 1105 communicatively connects the processing unit(s) 1110 with the read-only 1120, the system memory 1115, and the permanent storage device 1125.

From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1120 stores static data and instructions that are needed by the processing unit(s) 1110 and other modules of the electronic system. The permanent storage device 1125, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1125.

Other embodiments use a removable storage device (such as a floppy disk or a flash drive) as the permanent storage device 1125. Like the permanent storage device 1125, the system memory 1115 is a read-and-write memory device. However, unlike storage device 1125, the system memory 1115 is a volatile read-and-write memory, such as a random access memory. The system memory 1115 stores some of the instructions and data that the processor needs at runtime. In some embodiments, the invention's processes are stored in the system memory 1115, the permanent storage device 1125, and/or the read-only 1120. For example, the various memory units include instructions for processing appearance alterations of displayable characters in accordance with some embodiments. From these various memory units, the processing unit(s) 1110 retrieves instructions to execute and data to process in order to execute the processes of some embodiments.

The bus 1105 also connects to the input and output devices 1130 and 1135. The input devices enable the user to communicate information and select commands to the electronic system. The input devices 1130 include alphanumeric keyboards and pointing devices (also called "cursor control devices"). The output devices 1135 display images generated by the electronic system 1100. The output devices 1135 include printers and display devices, such as cathode ray tubes (CRT) or liquid crystal displays (LCD). Some embodiments include devices such as a touchscreen that functions as both input and output devices.

Finally, as shown in FIG. 11, bus 1105 also couples electronic system 1100 to a network 1140 through a network adapter (not shown). In this manner, the computer can be a part of a network of computers (such as a local area network ("LAN"), a wide area network ("WAN"), or an intranet), or a network of networks (such as the Internet). Any or all components of electronic system 1100 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 4-6 conceptually illustrate processes in which the specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A remote refill shopping cart system that allows replenishment of small parts inventory by visual inspection without part numbers or part names, the remote refill shopping cart system comprising:
a physical tray comprising a flat tray bottom surface having edges that define a perimeter around the flat tray bottom surface and surface space within the edges used to store one or more physical small parts from each of a plurality of different types of small parts, an outer tray enclosure wall along the perimeter of the flat tray bottom surface, and at least one partition wall that divides the surface space into a plurality of tray compartments, wherein said physical tray includes a physical tray layout defined by the outer tray enclosure wall, the at least one partition wall, and the plurality of tray compartments, wherein physical small parts from a first type of small parts in the plurality of different types of small parts are stored in a first tray compartment of the plurality of tray compartments and physical small parts from a second type of small parts in the plurality of different types of small parts are stored in a second tray compartment of the plurality of tray compartments;
a product order computing device comprising a processor, a memory unit, a local data storage unit, and a remote refill shopping cart program that runs on the processor and displays a remote refill shopping cart interface on a display screen of the product order computing device, said remote refill shopping cart interface including a plurality of user-selectable tray compartment interface areas comprising a first user-selectable tray compartment interface area and a second user-selectable tray compartment interface area that are organized in the remote refill shopping cart interface as a scaled replication of the physical tray layout with the first user-selectable tray compartment interface area corresponding to the first tray compartment in the plurality of tray compartments and the second user-selectable tray compartment interface area corresponding to the second tray compartment in the plurality of tray compartments, wherein a user of the product order computing device orders a refill set of small parts by selection of a particular user-selectable tray compartment interface area from the first user-selectable tray compartment interface area and the second user-selectable tray compartment interface area, wherein the refill set of small parts corresponds to the type of small parts stored in the tray compartment that corresponds to the particular user-selectable tray compartment interface area;
an order fulfillment server computing device comprising a server processor, a server memory unit, a local server storage unit, and a remote refill order fulfillment program that runs on the server processor to receive a data transmission associated with a small parts replenishment order over a network front the product order computing device and to fulfill the small parts replenishment order; and
a remote refill orders database management server computing device comprising a database management processor, a database storage device, and a database management program that runs on the database management processor to store in and retrieve from the database storage device a set of small parts replenishment orders.

2. The remote refill shopping cart system of claim 1, wherein the product order computing device is a mobile computing device.

3. The remote refill shopping cart system of claim 1 further comprising a web server computing device comprising a web server processor, a web server memory unit, a web server data storage unit, and a remote refill access interface that performs authentication in relation to returning users attempting to access the remote refill order fulfillment program to order small parts.

4. The remote refill shopping cart system of claim 1, wherein the remote refill shopping cart interface further includes a small parts inventory category area comprising a set of small parts inventory categories displayed in the small parts inventory category area of the remote refill shopping cart interface.

5. The remote refill shopping cart system of claim 4, wherein each small parts inventory category in the set of small parts inventory categories is a tool which when selected in the small parts inventory category area triggers display of a small parts inventory sub-category area that overlays the small parts inventory category area and the plurality of user-selectable tray compartment interface areas, said small parts inventory sub-category area comprising a set of small parts inventory sub-categories associated with selection of the small parts inventory category.

6. The remote refill shopping cart system of claim 1, wherein the physical tray is a first physical tray, wherein the one or more physical small parts is a first set of physical small parts, wherein the plurality of different types of small parts is a first plurality of different types of small parts, wherein the remote refill shopping cart system further comprises a second physical tray comprising a second flat tray bottom surface having second bottom surface edges that define a second bottom surface perimeter around the second flat tray bottom surface and second bottom surface space within the second bottom surface edges used to store a second set of physical small parts from each of a second plurality of different types of small parts, a second outer tray enclosure wall along the second bottom surface perimeter of the second flat tray bottom surface, and at least one second tray partition wall that divides the second bottom surface space into a plurality of second physical tray compartments, wherein said second physical tray includes a second physical tray layout defined by the second outer tray enclosure wall the at least one second tray partition wall, and the plurality of second physical tray compartments, wherein physical small parts from a third type of small parts in the second plurality of different types of small parts are stored in a third tray compartment of the plurality of second physical tray compartments and physical small parts from a fourth type of small parts in the second plurality of different types of small parts are stored in a fourth tray compartment of the plurality of second physical tray compartments.

7. The remote refill shopping cart system of claim 6, wherein the plurality of second physical tray compartments includes a plurality of adapted tray slots comprising at least one circle tray slot.

8. The remote refill shopping cart system of claim 7, wherein the remote refill shopping cart interface is a first remote refill shopping cart interface associated with the first physical tray, wherein the remote refill shopping cart program includes a second remote refill shopping cart interface that is associated with the second physical tray, wherein the second remote refill shopping cart interface includes a second plurality of user-selectable tray compartment interface areas comprising a third user-selectable tray compartment interface area and a fourth user-selectable tray compartment interface area that are organized in the second remote refill shopping cart interface as a scaled replication of the second physical tray layout with the third user-selectable tray compartment interface area corresponding to the third tray compartment in the plurality of second physical tray compartments and the fourth user-selectable tray compartment interface area corresponding to the fourth tray compartment in the plurality of second physical tray compartments wherein the third tray compartment includes the circle tray slot and the fourth tray compartment includes at least one of a parallelogram tray slot and a four-sided non-parallelogram tray slot.

9. The remote refill shopping cart system of claim 6, wherein the remote refill shopping cart program further displays in the remote refill shopping cart interface a plurality of full tray small parts inventory ordering categories comprising a first full tray small parts inventory ordering category associated with the first physical tray layout and a second full tray small parts inventory ordering category associated with the second physical tray layout.

10. The remote refill shopping cart system of claim 1, wherein the physical tray layout is a first physical tray layout, wherein the plurality of tray compartments comprises a plurality of parallelogram tray slots.

* * * * *